United States Patent
Shan et al.

(10) Patent No.: US 11,455,170 B2
(45) Date of Patent: Sep. 27, 2022

(54) PROCESSING DEVICES AND DISTRIBUTED PROCESSING SYSTEMS

(71) Applicant: MONTAGE TECHNOLOGY CO., LTD., Shanghai (CN)

(72) Inventors: Gang Shan, Shanghai (CN); Ye Yang, Shanghai (CN); Jingzhong Yang, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 38 days.

(21) Appl. No.: 17/128,229

(22) Filed: Dec. 21, 2020

(65) Prior Publication Data

US 2021/0200548 A1 Jul. 1, 2021

(30) Foreign Application Priority Data

Dec. 30, 2019 (CN) .......................... 201911392565.8

(51) Int. Cl.
*G06F 9/30* (2018.01)
*G06F 13/362* (2006.01)
*G06F 13/40* (2006.01)
*G06F 9/48* (2006.01)

(52) U.S. Cl.
CPC ........ *G06F 9/30145* (2013.01); *G06F 9/4843* (2013.01); *G06F 13/362* (2013.01); *G06F 13/404* (2013.01)

(58) Field of Classification Search
CPC .. G06F 13/362; G06F 13/404; G06F 9/30145; G06F 9/4843
See application file for complete search history.

(56) References Cited

U.S. PATENT DOCUMENTS

2016/0011964 A1* 1/2016 Rostoker ............. G06F 12/0215
711/103

* cited by examiner

*Primary Examiner* — Zachary K Huson
(74) *Attorney, Agent, or Firm* — Jun He Law Offices P.C.; James J. Zhu

(57) ABSTRACT

The present application pertains to a processing device or a distributed processing system using the processing device. The processing device comprises an instruction parsing module configured to receive a data processing instruction indicating a predetermined data processing operation on target data, wherein the data processing instruction comprises a task type field, a data processing operation field, and a data address field; and determine whether the data processing instruction carries the target data according to the task type field; and a data processing module performing the predetermined data processing operation on the target data according to the data processing operation field; wherein, when the data processing instruction carries the target data, the data processing module receives the target data carried by the data processing instruction from the instruction parsing module to perform the predetermined data processing operation on the target data; when the data processing instruction carries the storage address of the target data in the storage module, the processing device accesses the storage module according to the storage address and obtains the target data stored in the storage module.

21 Claims, 7 Drawing Sheets

PROCESSING DEVICES AND DISTRIBUTED PROCESSING SYSTEMS

FIELD OF THE INVENTION

The present invention generally relates to the field of computer technology, and more specifically, to a processing device and a distributed processing system including the processing device.

BACKGROUND OF THE INVENTION

In traditional computer architectures with a central processing unit ("CPU") as the core, the CPU and memory have different functions. The CPU is mainly responsible for conducting data calculation and controlling, and the memory is responsible for data storage. However, with the demand for massive data processing and storage brought about by the development of the Internet and the Internet of Things technology, the defects of this traditional architecture have become increasingly prominent. For one thing, in the face of massive data processing tasks, the computing power of the CPU itself is seriously insufficient. For another, the bandwidth of the data bus between the existing CPU and the memory fails to meet the demand for a large amount of data interaction.

Moreover, this traditional computer architecture also leads to the inefficient use of memory resources of a large number of devices in the system.

Therefore, it is necessary to provide an improved computer processing architecture.

SUMMARY OF THE INVENTION

One purpose of the present application is to provide a distributed processing system to improve the utilization efficiency of the memory and the processing unit of various devices in traditional computer systems.

In one aspect of the present application, a processing device is provided. The processing device is coupled to a storage module, for controlling access to the storage module and performing data processing, and the processing device comprises: an instruction parsing module configured to receive a data processing instruction indicating a predetermined data processing operation on target data, wherein the data processing instruction comprises a task type field, a data processing operation field, and a data address field; the instruction parsing module is further configured to analyze the data processing instruction, and determine whether the data processing instruction carries the target data according to the task type field in the data processing instruction obtained by the instruction parsing module through parsing; and a data processing module coupled to the instruction parsing module and configured to perform the predetermined data processing operation on the target data according to the data processing operation field in the data processing instruction obtained by the instruction parsing module; wherein, when the data processing instruction carries the target data, the data processing module receives the target data carried in the data address field of the data processing instruction from the instruction parsing module to perform the predetermined data processing operation on the target data; when the data address field of the data processing instruction carries the storage address of the target data in the storage module, the processing device accesses the storage module according to the storage address and obtains the target data stored in the storage module.

In another aspect of the present application, a distributed processing system is provided. The distributed system comprises a main controller and one or more processing components coupled via a bus. Wherein the processing component comprises a storage module and a processing device coupled to the storage module, the processing device is configured to control access to the storage module and process data; the main controller is configured to provide the processing device with a data processing instruction for performing a predetermined data processing operation on target data, wherein the data processing instruction comprises a task type field, a data processing operation field, and a data address field; the main controller is further configured to selectively carry the target data or a storage address of the target data in the data address field of the data processing instruction; the processing device is configured to receive and analyze the data processing instruction, and determine whether the data processing instruction carries the target data according to the task type field in the data processing instruction obtained by the parsing, and when the data address field of the data processing instruction carries the target data, the processing device performs the predetermined data processing operation on the target data according to the data processing operation field in the data processing instruction; when the data address field of the data processing instruction carries the storage address of the target data, the processing device accesses the storage module according to the storage address to obtain the target data stored in the storage module, and performs the predetermined data processing operation on the target data according to the data processing operation field in the data processing instruction.

In yet another aspect of the present application, a method for controlling a processing device is provided. The processing device comprises an instruction parsing module and a data processing module coupled to each other, and the processing device is coupled to a storage module and configured to control access to the storage module and process data, and the control method comprises: receiving a data processing instruction indicating a predetermined data processing operation on target data by the instruction parsing module, wherein the data processing instruction includes a task type field, a data processing operation field, and a data address field; analyzing the data processing instruction by the instruction parsing module to determine whether the target data is carried by the data processing instruction according to the task type field; wherein, when the data address field of the data processing instruction carries the target data, the data processing module receives the target data carried by the data processing instruction from the instruction parsing module, and performs the predetermined data processing operation indicated by the data processing operation field on the target data; when the data address field of the data processing instruction carries a storage address of the target data, the processing device accesses the storage module according to the storage address to obtain the target data stored in the storage module, and performs the predetermined data processing operation indicated by the data processing operation field on the target data.

In still another aspect of the present application, a method for controlling data access and processing in a distributed processing system is provided. The distributed processing system comprises a main controller and one or more processing components coupled via a bus, and the processing component comprises a storage module and a processing device coupled to the storage module, the processing device is configured to control access to the storage module and process data. Wherein, the method comprises: providing a data processing instruction for performing a predetermined data processing operation on target data to the processing device by the main controller, wherein the data processing instruction comprises a task type field, a data processing operation field, and a data address field, the data address field carries the target data or a storage address of the target data; receiving and analyzing the data processing instruction by the processing device, and determining whether the data processing instruction carries the target data according to the task type field in the data processing instruction obtained by the parsing, and when the data address field of the data processing instruction carries the target data, the processing device performs the predetermined data processing operation on the target data according to the data processing operation field in the data processing instruction; when the data address field of the data processing instruction carries the storage address of the target data, the processing device accesses the storage module according to the storage address to obtain the target data stored in the storage module, and performs the predetermined data processing operation on the target data according to the data processing operation field in the data processing instruction.

The above is an overview of the present application, and may be simplified, may be summarized and may omit the details. Therefore, those skilled in the art shall understand that this part is only illustrative, and is not intended to limit the protection scope of the present application in any way. This summary is neither intended to determine the primary features or inevitable features of the subject matter sought to be protected, nor is intended to be used as an secondary measure to determine the protection scope of the subject matter sought to be protected.

BRIEF DESCRIPTION OF THE FIGURES

The above and other features of the disclosure of the present application will be more fully and clearly understood through the following detailed description and appended claims in combination with the figures. It can be understood that these figures only illustrate several embodiments of the disclosure of the present application, and therefore should not be considered as limiting the protection scope of the content of the present application. By adopting the figures, the content of the present application will be explained more clearly and in detail.

DETAILED DESCRIPTION OF THE INVENTION

Figure 1:
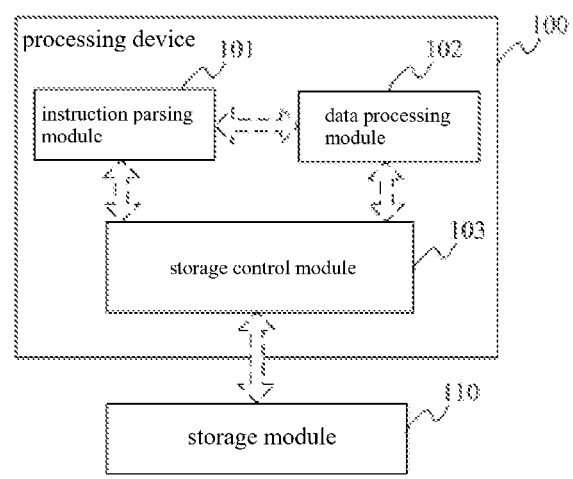
FIG. 1 shows a schematic diagram of a processing device 100 according to an embodiment of the present application.

In the following detailed description, refer to the drawings constituting a part thereof. In the drawings, similar reference numerals usually represent similar components, unless the context indicates otherwise. The illustrative embodiments described in the detailed description, drawings, and claims are not intended to limit. Without departing from the spirit or protection scope of the subject matter of the present application, other embodiments may be adopted, and other changes may be made. It can be understood that various aspects of the content of the present application generally described in the present application and illustrated in the drawings can be configured, substituted, combined, and designed with various configurations, and all of these clearly constitute a part of the content of the present application.

FIG. 1 shows a processing device 100 according to an embodiment of the present application. The processing device 100 may be connected to a storage module 110 to control the storage module 110 and perform data interaction therewith. The storage module 110 may include one or more memory banks. In some embodiments, the storage module 110 may be a storage module that conforms to the JEDEC double-rate synchronous dynamic random access memory (SDRAM) standard, for example, JEDEC DDR, DDR2, DDR3, DDR4, DDR5, and other double-rate memory standards. In addition, the storage module 110 may also be an internal memory that conforms to other standards or protocols, such as RAMBUS internal memory, or a memory that conforms to future memory standards or protocols. In some embodiments, the storage module may include volatile memory (such as dynamic random access memory), non-volatile memory (flash memory, such as NAND or NOR flash memory), or a combination of both. In other embodiments, the storage module may also be a new type of memory manufactured by different production processes, including but not limited to: magnetoresistive memory, phase change memory, resistive memory, semi-floating gate memory, or any type of other memory.

The processing device 100 and the storage module 110 that are connected to each other may be used in, for example, a computer system, a mobile device, a server, a smart device, or other electronic devices, and used as an internal memory or a processing unit. In some embodiments, the processing device 100 connected to the storage module 110 may be connected to a central processing unit of the system or devices mentioned above to execute data processing and storage interaction tasks instructed by the central processing unit.

As shown in FIG. 1, the processing device 100 includes an instruction parsing module 101, a data processing module 102, and a storage control module 103 that are coupled to each other. The instruction parsing module 101 receives an instruction from an external main controller, such as a central processing unit, and analyzes the received instruction, and the data processing module 102 may process the received data. In some embodiments, the data processing module 102 may also perform any desired calculation operations. The storage control module 103 is coupled to the storage module 110, so as to control access to the data stored in the storage module 110, for example, to read or to write data.

In some embodiments, the instruction parsing module 101 selectively sends specific information and instructions to the data processing module 102 and/or the storage control module 103 according to the parsing result of the received instruction. For example, the instruction parsing module 101 analyzes a data processing instruction for performing a predetermined data processing operation on target data, the instruction parsing module 101 further determines whether the data processing instruction carries the target data after analyzing. The parsing of the data processing instruction by the instruction parsing module 101 may be according to a predetermined data application protocol, and specific information related to the instruction parsing processes will be described in detail below.

It should be noted that the "target data" may be any data to be processed. In some embodiments, the "target data" is derived from an external storage device other than the storage module 110 and is included in the data processing instruction. In some embodiments, the external storage device may include an external storage module and an external processing device coupled to the external storage module, and the external processing device is configured to control access to the external storage module and process data of the external storage module. In other embodiments, the target data may have already been stored in the storage module 110, and the data processing instruction does not need to carry the target data, but includes a storage address indicating the storage location of the target data, which saves data bus resources for the processing device 100 to interact with external devices. In still other embodiments, the target data is stored in any available storage devices coupled to an external main controller other than the storage module 110. Specifically, the storage device may be a synchronous dynamic random access memory (SDRAM), a double data rate synchronous dynamic random access memory (DDR SDRAM), and a Rambus dynamic random access memory (RDRAM), for example, a dual in-line memory module (DIMM) or a single in-line memory module. Optionally, the storage device may also be a solid state drive (SSD) or similar bulk storage memory. Before the processing device 100 processes the target data, the target data is transferred to the storage module 110.

In some embodiments, the storage address provided by the main controller may be directly addressed to a specific storage location in the storage module 110, so that the main controller may directly access the storage module 110 according to the storage address without further converting the storage address by the storage control module 103.

The "predetermined data processing operation" referred to herein may be any processing operation on the target data, including any required calculation processing performed by the data processing module 102 on the target data. In some embodiments, the predetermined data processing operation may also be an access operation such as reading or writing of the target data in the storage module 110 performed by the storage control module 103.

Figure 2:
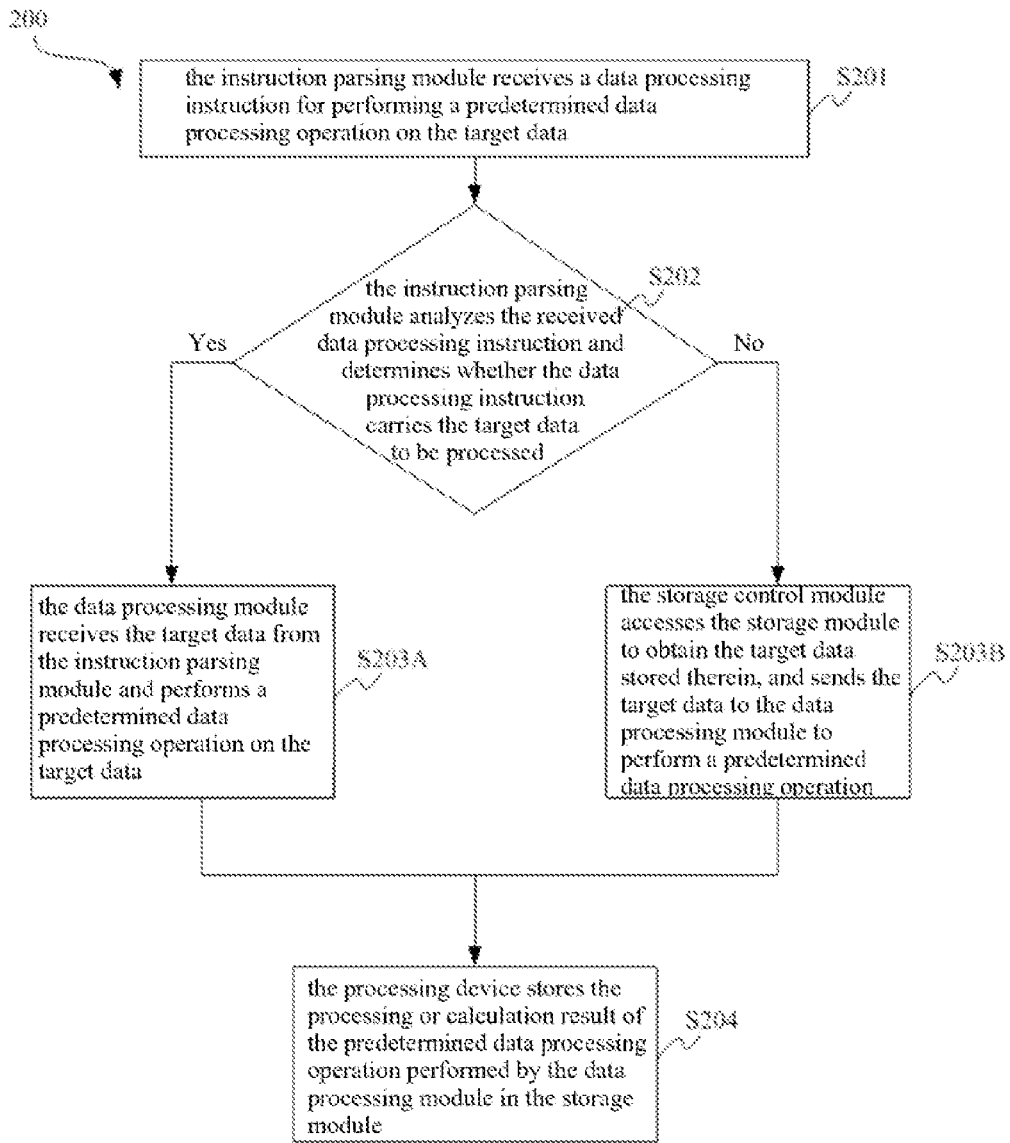
FIG. 2 shows a flowchart of a control method 200 of the processing device 100 shown in FIG. 1.

FIG. 2 shows a flowchart of a control method 200 performed by the processing device 100 shown in FIG. 1.

As shown in FIG. 2, in step S201, the instruction parsing module 101 receives a data processing instruction for performing a predetermined data processing operation on the target data. In step S202, the instruction parsing module 101 analyzes the received data processing instruction and determines whether the data processing instruction carries the target data to be processed. In some embodiments, the data processing instruction received by the instruction parsing module 101 includes task type description information indicating whether the data processing instruction carries the target data. The instruction parsing module 101 may make a correspondingly determination according to the task type description information. In some embodiments, the task type description information may be a task type description field or other identifiers according to a predetermined data application protocol, which will be described in detail below.

When the data processing instruction carries the target data to be processed, step S203A is performed. In step S203A, the data processing module 102 receives the target data carried by the data processing instruction from the instruction parsing module 101 and performs a predetermined data processing operation on the target data. In some embodiments, the instruction parsing module 101 sends the data processing instruction together with the carried target data to be processed to the data processing module 102, and the data processing module 102 performs a predetermined data processing operation indicated in the data processing instruction on the target data. When the data processing instruction does not carry the target data to be processed, step S203B is performed. In step S203B, the storage control module 103 accesses the storage module 110 to obtain the target data stored therein, and sends the target data to the data processing module 102 to perform a predetermined data processing operation. In some embodiments, the instruction parsing module 101 provides an instruction to access the target data in the storage module 110 and/or the storage address of the target data to the storage control module 103, and then the storage control module 103 accesses the storage address to perform a read/write operation on the target data.

In step S204, the processing device 100 stores the processing or calculation result of the predetermined data processing operation by the data processing module 102 in the storage module 110. Specifically, the data processing module 102 provides the processing result obtained by performing a predetermined data processing operation to the storage controller 103, and the storage controller 103 stores the processing result in the storage module 110. In some embodiments, the storage address of the processing result mentioned above in the storage module 110 is pre-included in the data processing instruction. In other embodiments, the final storage address of the processing result mentioned above in the storage module 110 is then sent to an external main controller, such as a central processing unit, via the instruction parsing module 101. It should be noted that, in some embodiments, after step S203A or 5203B, the processing or calculation result of the data processing module 102 after performing a predetermined data processing operation may be sent to an external main controller via the instruction parsing module 101, and then the external main controller provides the processing or calculation result to other storage modules, such as other memories coupled to the external main controller.

Optionally, before step S201, a state feedback step may be performed by the processing device 100. Specifically, after receiving the data processing instruction, the instruction parsing module 101 may send feedback information based on the state of the processing device 100 to indicate whether to accept or execute the data processing instruction. In some embodiments, the data processing instruction may also include an instruction identification field or identifier for identifying the data processing instruction, and the feedback information sent by the processing device 100 may also include the instruction identification field or identifier, thereby facilitating the controller issuing the data processing instruction to identify the specific data processing instruction corresponding to the feedback information. In some embodiments, the instruction parsing module 101 generates the feedback information mentioned above according to a predetermined data application protocol, which will be described in detail below.

Figure 3:
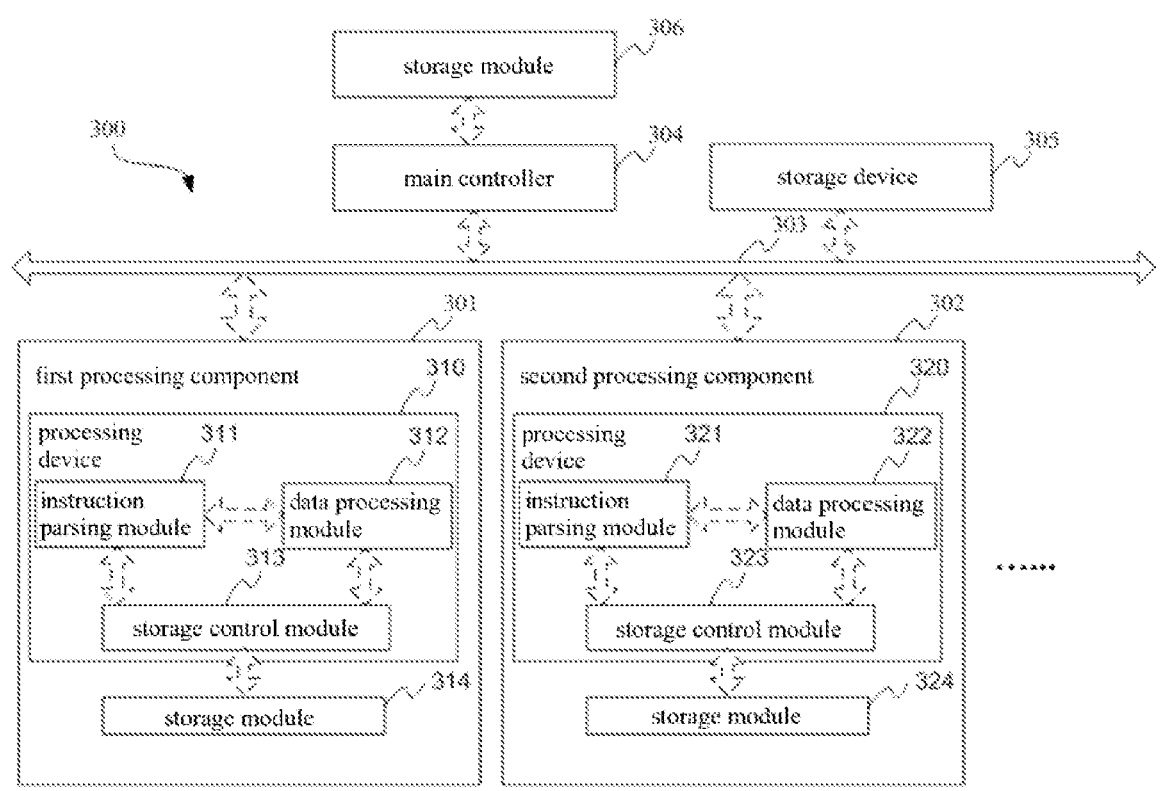
FIG. 3 shows a schematic diagram of a distributed processing system 300 according to an embodiment of the present application.

FIG. 3 shows a schematic diagram of a distributed processing system 300 according to an embodiment of the present application. The distributed processing system 300 may include one or more processing devices 100 shown in FIG. 1.

As shown in FIG. 3, the distributed processing system 300 comprises a first processing component 301 and a second processing component 302, which are coupled to a main controller 304 via a bus 303. The main controller 304 is configured to provide a data processing instruction for performing a predetermined data processing operation on a target data to the processing device 310 or 320 of the first processing component 301 or the second processing component 302, and the target data is optionally carried in the data processing instruction. The first processing component 301 comprises a storage module 314 and a processing device 310 coupled to the storage module 314. The processing device 310 further comprises an instruction parsing module 311, a data processing module 312, and a storage control module 313, which are coupled to each other. The storage control module 313 is coupled to the storage module 314 to control access to the data stored in the storage module 314. The structure and function of the second processing component 302 correspond to the first processing component 301, which comprises a storage module 324 and a processing device 320 coupled to the storage module 324. The processing device 320 further comprises an instruction parsing module 321, a data processing module 322 and a storage control module 323, which are coupled to each other. The storage control module 323 is coupled to the storage module 324 to control access to the data stored in the storage module 324. The processing devices 310, 320 and storage modules 314, 324 of the first processing component 301 and the second processing component 302 respectively corresponds to the processing device 100 and the storage module 110 that are coupled to each other as shown in FIG. 1, so their structure and function will not be repeated here. It should be noted that although only two processing components are shown in the figure, the distributed processing system may also have any number of corresponding processing components. In addition, two or more processing components may have the same or different structures, for example, one or more processing components may not have a storage module or a data processing module.

In some embodiments, a storage module of one or more processing components may be addressed and accessed by the main controller. Preferably, a storage module of one or more processing components adopt a uniform addressing. As such, the main controller can access each storage module and other storage devices in the system more effectively.

Continue to refer to FIG. 3, the distributed processing system 300 further comprises a storage device 305 coupled to a bus and a storage module 306 coupled to the main controller 304. The storage device 305 and the storage module 306 may be any available storage devices.

Figure 4:
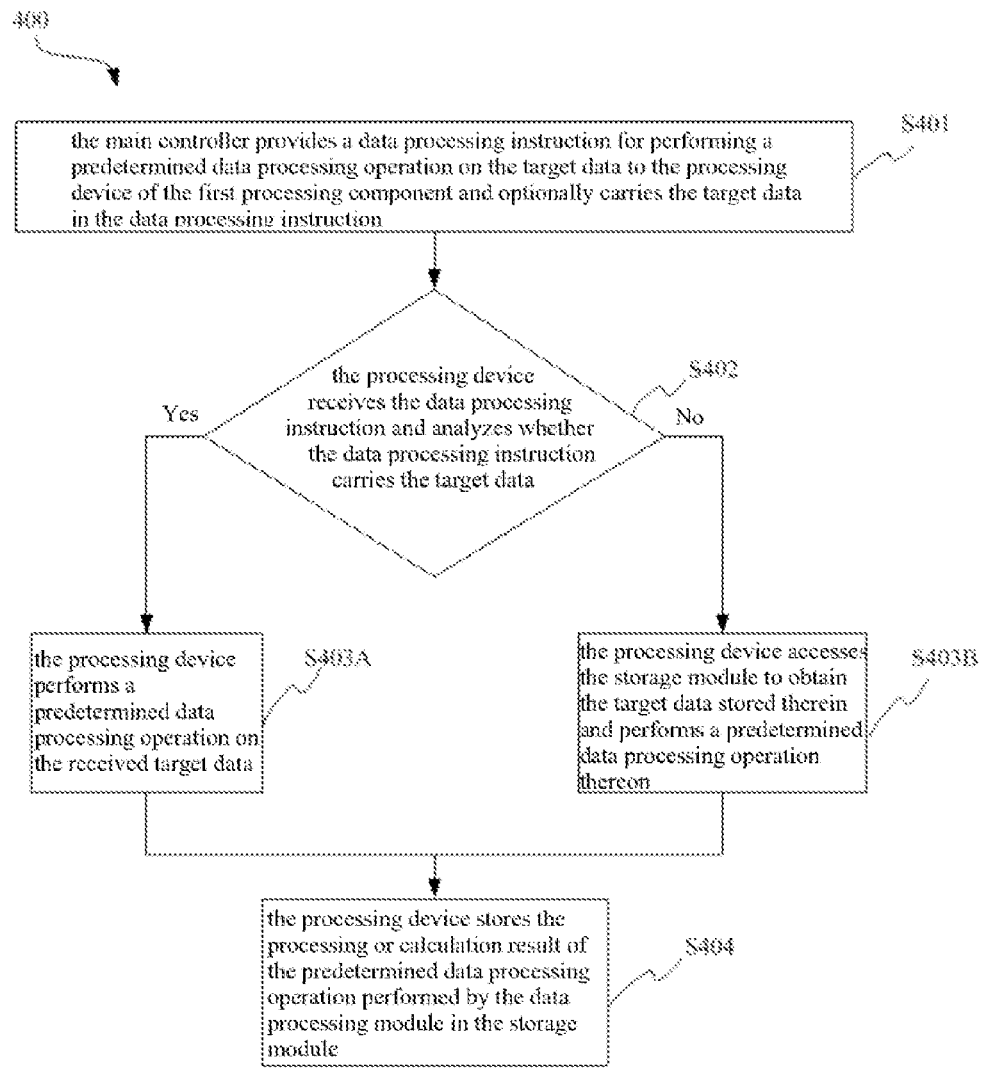
FIG. 4 shows a flowchart of a data accessing and processing method 400 of the distributed processing system 300 shown in FIG. 3.

FIG. 4 shows a flowchart of a method 400 of data accessing and processing performed by the distributed processing system 300 shown in FIG. 3.

As shown in FIG. 4, in step S401, the main controller 304 provides a data processing instruction for performing a predetermined data processing operation on the target data to the processing device 310 of the first processing component 301, and the target data is optionally carried in the data processing instruction. In some embodiments, the data processing instruction carrying the target data may be generated in the following manners. For example, the main controller 304 accesses any available storage devices coupled to the main controller 304 to obtain the target data. In some embodiments, the storage device may be a synchronous dynamic random access memory (SDRAM), a double data rate synchronous dynamic random access memory (DDR SDRAM), and a Rambus dynamic random access memory (RDRAM), such as a dual in-line memory module (DIMM) or a single in-line memory module (SIMM). In other embodiments, the storage device may be a solid-state drive (SSD) or a similar bulk memory. Subsequently, the main controller 304 sends the target data and the predetermined data processing operation to be performed thereon to the first processing component 301 in the form of a data processing instruction.

In step S402, the processing device 310 of the first processing component 301 receives the data processing instruction and analyzes whether the data processing instruction carries the target data. Specifically, in some embodiments, the instruction parsing module 311 receives a data processing instruction instructing to perform a predetermined data processing operation on the target data and analyzes whether the data processing instruction carries the target data. In some embodiments, the data processing instruction received by the instruction parsing module 311 includes task type description information indicating whether the data processing instruction carries the target data, and the instruction parsing module 311 may directly determine whether the data processing instruction carries the target data according to the task type description information. In some embodiments, the task type description information may be a task type description field according to a predetermined data application protocol, and the specific information will be described in detail below.

When the data processing instruction carries the target data to be processed, step S403A is performed, and the processing device 310 receives the target data carried by the data processing instruction and performs a predetermined data processing operation thereon. Specifically, in some embodiments, the instruction parsing module 311 sends the specific information of the data processing instruction obtained after analyzing together with the target data to be processed to the data processing module 312, and the data processing module 312 performs a predetermined data processing operation on the target data. When the data processing instruction does not carry the target data to be processed, step S403B is performed, and the processing device 310 accesses the storage module 314 to obtain the target data stored therein and performs a predetermined data processing operation on the obtained target data. In some embodiments, the instruction parsing module 311 provides the storage address of the target data obtained after analyzing to the storage control module 313, which sends the obtained target data to the data processing module 312 to perform a predetermined data processing operation.

Subsequently, in step S404, the processing device 310 stores the processing or calculation result of the predetermined data processing operation performed by the data processing module 312 in the storage module 314. Specifically, the processing result obtained by the data processing module 312 performing a predetermined data processing operation is stored in the storage module 314 via the storage controller 313. It should be noted that the processing or calculation result of the predetermined data processing operation may be alternatively stored in any available storage devices coupled to the external main controller. In some embodiments, the storage device may be a synchronous dynamic random access memory (SDRAM), a double data rate synchronous dynamic random access memory (DDR SDRAM), and a Rambus dynamic random access memory (RDRAM), such as a dual in-line memory module (DIMM) or a single in-line memory module (SIMM). The storage device may be a solid-state drive (SSD) or a similar bulk storage memory in other embodiments.

Optionally, a data transfer step may be included before step 401. The main controller 304 controls the distributed processing system 300 to transfer the target data from the outside of the first processing component 301 to the storage module 314 of the first processing component 301. In some embodiments, the target data is stored in any available storage device coupled to the main controller 304, such as the storage device 305 or the storage module 306. When the data transfer step is performed, the main controller 304 or a direct memory access (DMA) controller (not shown in the figure) of the distributed system 300 directly accesses the target data stored in the storage device 305 or the storage module 306, and transfers it to the storage module 314 of the first processing component 301. In some embodiments, the target data stored in the storage module 324 of the second processing component 302 may also be directly accessed by the main controller 304 or a direct memory access (DMA) controller (not shown in the figure) of the distributed system 300, and is transferred to the storage module 314 of the first processing component 301. This data transfer step may be adopted to prepare the target data. For example, the target data is stored in a designated storage address before being processed by the first processing component 301, so that merely a data processing instruction without carrying the target data is needed for subsequent data processing. In other embodiments, the processing device 320 of the second processing component 302 accesses the storage module 324 and provides the obtained target data to the first processing component 301 according to the data copy or transfer instruction of the main controller 304.

It can be understood that the flowchart shown in FIG. 4 is depicted by taking the data processing operation performed by the first processing component 301 as an example. In some embodiments, the second processing component 302 or other processing components coupled to the bus 303 may perform the received data processing instruction in a similar manner, which will not be repeated herein. In some embodiments, the main controller 304 may allocate tasks related to the data processing instruction according to each processing component' occupancy, which will be further described below.

It should be noted that, in some embodiments, the processing device 100 shown in FIG. 1 and the external main controller, or the first processing component 301, the second processing component 302, and the main controller 304 shown in FIG. 3, may be coupled therebetween via a physical bus interface complying with CXL (Compute Express Link), GenZ (Generation Z), CCIX (Cache Coherent Interconnect for Accelerators), NVDIMM protocols/ standards or similar, so that an external controller, such as the main controller 304, may directly access the storage modules 110, 314, and 324. The CXL protocol interface is to encapsulate the CXL protocol into PCIe link layer data packets for transmission. The PCIe master control backend on the CPU side shunts the CXL exclusive transaction to the CXL processing logic for processing according to the transaction identifier. In addition to the CXL's function, GenZ also has the function of GenZ Switch, which expands the bus into a switched network, so that a large amount of CPUs, I/O devices, and memories can be coupled to the GenZ switched network to achieve higher scalability. The architecture and functions of CCIX and GenZ are similar.

In some embodiments, the processing device 100 shown in FIG. 1 and the distributed processing system 300 shown in FIG. 3 adopt a predetermined data application protocol, and the predetermined data application protocol includes settings of the specific interaction relationship between the processing device 100, the first processing component 301 and the external controller or the main controller 304. Specifically, the predetermined data application protocol may comprise definitions of the data processing instruction, the feedback information related to the instruction, and the structure of the description field of the processing result returning instruction. Besides, the predetermined data application protocol may also has the character information of specific fields or the description meaning of numbers in description fields and specific interaction rules between the processing device 100, the first processing component 301, and the external controller such as the main controller 304. It can be understood that, in some embodiments, the predetermined data application protocol adopted by the distributed processing system 300 shown in FIG. 3 further comprises settings of the specific interaction relationship between a second processing component 302 or other processing components coupled to the bus 303 and the main controller 304. In some embodiments, the second processing component 302 or other processing components (not shown in the figure) coupled to the bus 303 and the main controller 304 have settings of the specific interaction relationship the same as or similar to the first processing component 301. However, in other embodiments, the setting of the specific interaction relationship mentioned above may differ due to the differences between the characteristics of the processing components themselves.

Based on a predetermined data application protocol, the application device 100 shown in FIG. 1 or the distributed processing system 300 shown in FIG. 3 may flexibly define or control the functions of the processing device 100, the first processing component 301, and the second processing component 302, so as to reduce the operating load of the external controller such as the main controller 304 and the requirement on the bus bandwidth. In some embodiments, the data application protocol is predetermined in the instruction parsing module and the controller that interacts with the instruction parsing module, such as the instruction parsing module 101 shown in FIG. 1 and the external main controller interacting with it, the instruction parsing module 311, 321 and the main controller 304 shown in FIG. 3. The data application protocol is predetermined in all modules or units involved in data processing operations in other embodiments.

Table 1 shows specific character information in a task type field (Task Type) defined in a predetermined data application protocol according to an embodiment of the present application and specific information represented by them. It should be noted that what is shown in Table 1 is specific character information, but the task type field may also be set to any distinguishable number, value, label or code. In some embodiments, the character information of the task type field listed in Table 1 is substituted with binary, octal, decimal, or hexadecimal codes.

TABLE 1

| Character Information of the Task Type Field (Task type) | Information Represented by the Character Information |
| --- | --- |
| Task_W_data | Instruction with processing data |
| Task_Wo_data | Instruction without processing data |
| Task_Datamove | Instruction for data movement |
| Task_Rsp | Feedback on instuction received |
| Task_Ack | Response to feedback on instruction received |
| Task_Retry | Feedback on instruction unaccepted |
| Task_Result_Return | Instruction for returning processing result |

As shown in Table 1, when the task type field ("Task type") is set to different character information, different specific information related to the data processing instruction may be correspondingly characterized. The processing device 100 shown in FIG. 1 and the processing component or main controller in the distributed processing system 300 shown in FIG. 3 may not only construct different data processing instructions, the feedback information related to the instructions and instructions for returning processing result according to the corresponding relationship shown in Table 1, but also determine the specific information characterized by character information or code of the task type field in the received instructions or information.

Specifically, as shown in Table 1, Task_W_data is used to characterize that the data processing instruction has already carried the target data, Task_Wo_data is used to characterize that the data processing instruction does not carry the target data, and Task_Datamove is used to characterize that the data processing instruction only involves data movement tasks. Therefore, when the instruction parsing module 101 shown in FIG. 1 or the instruction parsing module 311 or 321 shown in FIG. 3 finds that the character information of the task type field in the received data processing instruction is the specific character information mentioned above by analyzing, it can be determined accordingly whether the data processing instruction carries the target data and whether it involves data movement tasks. For example, when the instruction parsing module 101 shown in FIG. 1 finds that the character information of the task type field in the received data processing instruction is Task_W_data by analyzing, it can be determined that the data processing instruction carries the target data to be processed.

Continue to refer to Table 1, when the character information in the task type field is Task_Rsp, it characterizes that the processing device or component has accepted the data processing instruction. When the character information of the task type field is Task_Ack, it characterizes a response of controller to a feedback information, whose task type filed is Task_Rsp, sent by the processing device or component. When the character information of the task type field is Task_Retry, it characterizes the processing device or component did not accept the data processing instruction. Based on these, the processing device or component and the controller may effectively update the status, progress information or so on related to the data processing instruction. On the one hand, when the character information of the task type field in the feedback information sent by the processing device 100 shown in FIG. 1 or the first processing component 301 shown in FIG. 3 to the controller is Task_Rsp, the controller may determine that the processing device 100 or the first processing component 301 has accepted the data processing instruction. Subsequently, the controller may send further feedback information in which the character information of the task type field is Task_Ack to the processing device 100 or the first processing component 301, and the processing device 100 or the first processing component 301 may determine further response information of the controller based on this. For example, confirm that the controller has received the previously forwarded feedback information.

As shown in Table 1, when the character information of the task type field is Task_Result_Return, it characterizes the returning processing result instruction requesting the return of the data processing result. For example, when the character information of the task type field in the received instruction, which is analyzed by the instruction parsing module 101 shown in FIG. 1 or the instruction parsing module 311 or 321 shown in FIG. 3, is Task_Result_Return, it can determine that the controller issuing the instruction requests it to return the result data of the previously performed data processing instruction.

It should be noted that Table 1 only serves as an example. In some embodiments, the task type field may also be set to other characters, numbers, codes, or values, and may also represent any other information related to the data processing instruction.

In some embodiments, in addition to the task type field mentioned above, the data processing instruction, related feedback information, or the returning processing result instruction under the predetermined data application protocol may also include other description fields. Specifically, it may include an instruction identification field in some embodiments, which is used to characterize the specific data processing task associated with the instruction or information. The processing device 100, the first processing component 301, and the main controller 304 may analyze the instruction identification field to identify the specific data processing task corresponding to the instruction or feedback information including the instruction identification field. In some embodiments, the instruction or related feedback information according to the predetermined data application protocol may further include a predetermined data processing operation field, which is used to characterize the predetermined data processing operation performed on the target data. Specifically, different characters, numbers or codes in the predetermined data processing operation field may be defined as different operator information or operation information corresponding to data processing, so that the processing device or component may quickly and accurately determine the specific data processing operation to be performed. In some embodiments, the instruction or related feedback information under the predetermined data application protocol may also comprise a parameter field, which is used to characterize any parameter setting information related to the data processing operation. In some embodiments, the instruction or related feedback information under the predetermined data application protocol may further include a data address field, which is used to characterize the address where the data is stored, such as the length of the data and the initial storage address where it is stored. It should be noted that the data address field may be used to characterize the storage address of the target data and may also be used to characterize the storage address of the processing result data. In some embodiments, the character information, number or value of the field may be set to characterize the initial address and the target address in the data movement task. In addition, the instruction or related feedback information under the predetermined data application protocol may also include a field used to characterize any related information of the data processing operation, such as a time field used to characterize the performance time of the data processing task, a priority field used to characterize the priority of the data processing task, or a result field used to represent the data processing result directly, etc.

Figure 5A:
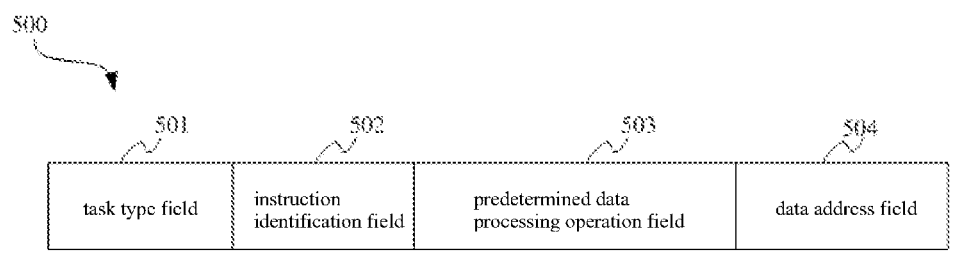
FIG. 5A shows a schematic diagram of the structure of a description field 500 of a data processing instruction according to an embodiment of the present application.
Figure 5B:
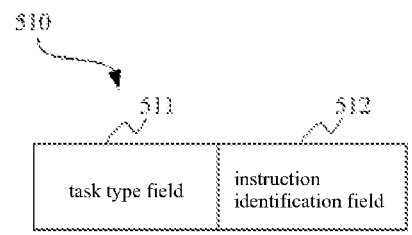
FIG. 5B shows a schematic diagram of the structure of a description field 510 of the feedback information related to the data processing instruction shown in FIG. 5A.
Figure 5C:
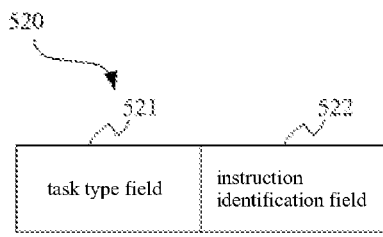
FIG. 5C shows a schematic diagram of the structure of a description field 520 of the processing result returning instruction of the data processing instruction shown in FIG. 5A.

As mentioned above, the predetermined data application protocol may not only define the specific description fields included in the instruction and related feedback information but also define the description field structure thereof. FIG. 5A shows a schematic diagram of the structure of a description field 500 of a data processing instruction according to an embodiment of the present application. FIG. 5B shows a schematic diagram of the structure of the description field 510 of the feedback information related to the data processing instruction shown in FIG. 5A. FIG. 5C shows a schematic diagram of the structure of the description field 520 of the instruction for returning processing result of the data processing instruction shown in FIG. 5A.

As shown in FIG. 5A, the description field 500 of the data processing instruction includes a task type field 501, an instruction identification field 502, a predetermined data processing operation field 503, and a data address field 504. Specifically, according to the predetermined application protocol and the specific information of the predetermined data processing operation task, the external main controller 304 constructs a data processing instruction comprising the description field 500 shown in FIG. 5A, and sends the data processing instruction to the instruction parsing module 101 or the instruction parsing modules 311, 321 shown in FIG. 3. Subsequently, the instruction parsing module 101, 311, or 321 determines whether the data processing task carries data according to the task type field 501, determines the identification information of the data processing task according to the instruction identification field 502, determines the operator information or operation information related to the data processing task according to the predetermined data processing operation field 503, and determines the storage information of the target data (for example, the length of the data and the initial storage address where it is stored.) It should be noted that the description field 500 of the data processing instruction shown in FIG. 5A only serves as an example without specific limitation. For example, when the data processing instruction itself carries data, the data address field 504 may alternatively represent the target data. The data address field 504 may include a data length subfield and a data subfield, wherein the data length subfield may be used to mark the maximum length of the data subfield or used to mark the length of the target data in the data subfield, and the data subfield is used to carry the specific target data. It can be understood that the information indicated by the data address field 504 may be related to the specific task type of the task type field 501, that is, when the task type field 501 is Task_Wo_data, the data address field 504 may indicate the storage address of the target data. When the task type field 501 is Task_W_data, the data address field 504 may indicate the target data. In some embodiments, the data address field 504 may include both a subfield used to indicate a storage address and a subfield used to indicate target data, and these subfields are assigned according to the specific value of the task type field 501, or not assigned. In some embodiments, the description field of some data processing instructions may further comprise a parameter field, which is used to characterize all setting information related to the data processing task.

As shown in FIG. 5B, the description field 510 of the feedback information related to the data processing instruction shown in FIG. 5A comprises a task type field 511 and an instruction identification field 512, wherein the instruction identification field 512 is the same as or corresponding to the characters, values, or code information of the instruction identification field 502 shown in FIG. 5A. As mentioned above, the character information of the task type field 511 in the related feedback information may be set to Task_Rsp, Task_Ack, or Task_Retry, to achieve effective interaction between the controller and the processing device. The specific information will be detailed below. It should be noted that the description field 510 of the related feedback information shown in FIG. 5B only serves as an example without specific limitations. In some embodiments, the description field 510 may also include other types of specific field information, such as a delay field that characterizes delayed sending of a request or delayed execution of an operation.

As shown in FIG. 5C, the returning processing result instruction 520 of the data processing instruction shown in FIG. 5A comprises a task type field 521 and an instruction identification field 522, wherein the instruction identification field 522 is the same as or corresponding to the characters, values, or code information of the instruction identification field 502 shown in FIG. 5A. As mentioned above, the character information of the task type field 521 in the instruction for returning processing result may be set to Task_Result_Return. It should be noted that the description field 520 of the returning processing result instruction shown in FIG. 5C only serves as an example without specific limitations. In some embodiments, the description field 520 may also comprise other types of specific field information, such as a time field that characterize the return time of the processing result or other parameter fields.

Figure 6:
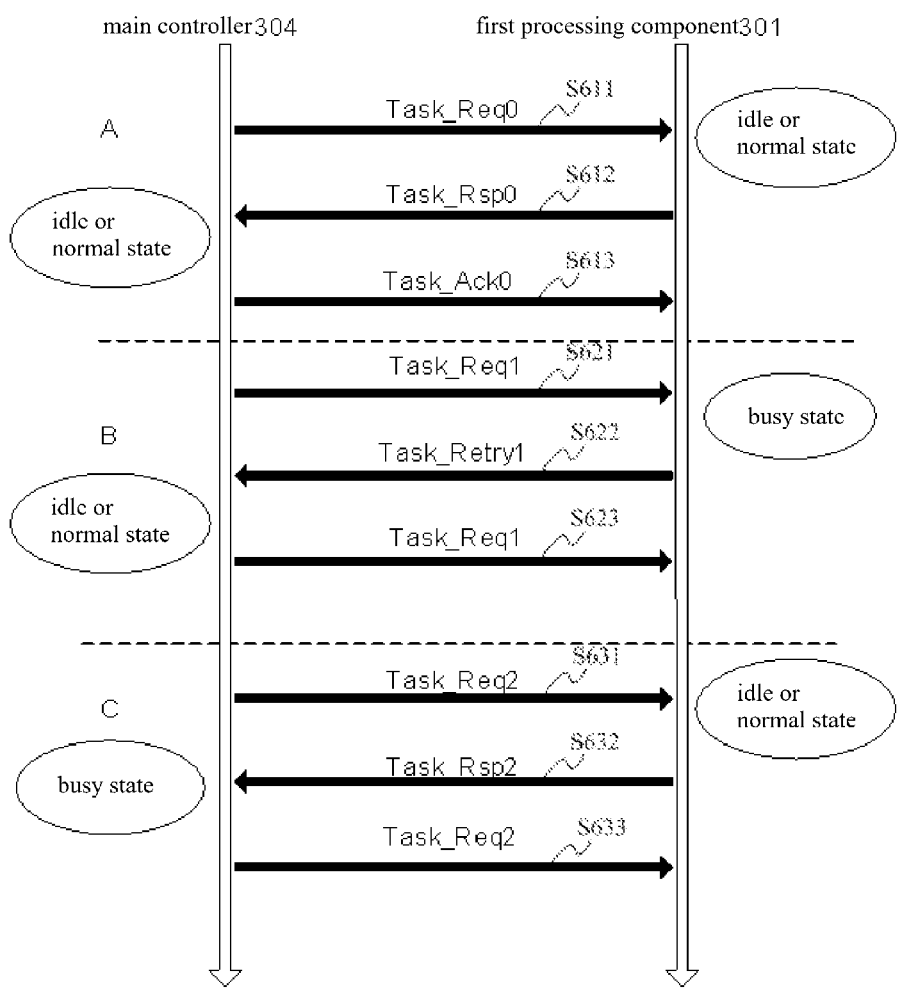
FIG. 6 shows a schematic diagram of the interaction between the main controller 304 and the first processing component 301 shown in FIG. 3.

FIG. 6 shows a schematic diagram of various situations of interaction between the main controller 304 and the first processing component 301 shown in FIG. 3. Among them, part A shows the interaction between the main controller 304 and the first processing component 301 in an idle or normal state. In step S611, the main controller 304 sends the data processing instruction Task_Req0 to the first processing component 301, wherein the task type field "Task type" may be the task type character information, value or code associated with any data processing operation, such as Task_W_data, Task_Wo_data, Task_Datamove, or Task_Result_Return shown in Table 1. In step S612, the instruction parsing module 311 sends feedback information to the main controller 304 according to the idle state of the first processing component 301 and the predetermined data application protocol. The character information in the task type field of the feedback information is the character information Task_Rsp0 indicating that the data processing instruction is accepted. Meanwhile, the main controller 304 is also in an idle or normal state. In step S613, the main controller 304 sends further feedback information to the first processing component 301 after receiving the feedback information from the first processing component 301. The character information in the task type field of the feedback information is Task_Ack0, which is used to characterize the response to the previous feedback information.

Part B of FIG. 6 shows the interaction situation where the main controller 304 is in an idle or a normal state and the first processing component 301 is in a busy state. Step S621 is similar to step S611. The main controller 304 sends a data processing instruction to the first processing component 301, and the character information included in the task type field is Task_Req1 similar to Task_Req0. Since the first processing component 301 is in a busy state and cannot accept the data processing instruction, the instruction parsing module 311 sends feedback information to the main controller 304 according to a predetermined data application protocol in step S622. The feedback information comprises the character information Task_Retry1 in the task type field, which indicates that the data processing instruction is not accepted. After receiving the feedback information mentioned above for a certain time interval, the main controller 304 may repeat the operation of step S621 in step S623, and sends the data processing instruction to the first processing component 301 again.

Part C of FIG. 6 shows an interaction situation where the main controller 304 is in a busy state and the first processing component 301 is in an idle or normal state. Step S631 is similar to step S611. The main controller 304 sends a data processing instruction to the first processing component 301. The character information of the task type field in the data task processing instruction is Task_Req2 similar to Task_Req0. Step S632 is similar to step S612. The instruction parsing module 311 sends feedback information to the main controller 304 according to the idle state of the first processing component 301 and the predetermined data application protocol. The character information in the task type field of the feedback information is Task_Rsp2 which characterizes the acceptance of the data processing instruction. Since the main controller 304 is in a busy state at this time, it cannot respond to the feedback information mentioned above of the first processing component 301. Therefore, after receiving the feedback information containing the character information Task_Rsp2 for a certain time interval, the main controller 304 repeats the operation of step S631 in step S633, and sends the data processing instruction with the task type field Task_Req2 to the first processing component 301 again.

It should be pointed out that although FIG. 6 only shows the status and information interaction between the main controller 304 and the first processing component 301, the method is also applicable between the main controller 304 and the second processing component 302 or other processing components (not shown in the figure) coupled to the bus 303, as well as between the processing device 100 shown in FIG. 1 and an external main controller coupled thereto.

Figure 7:
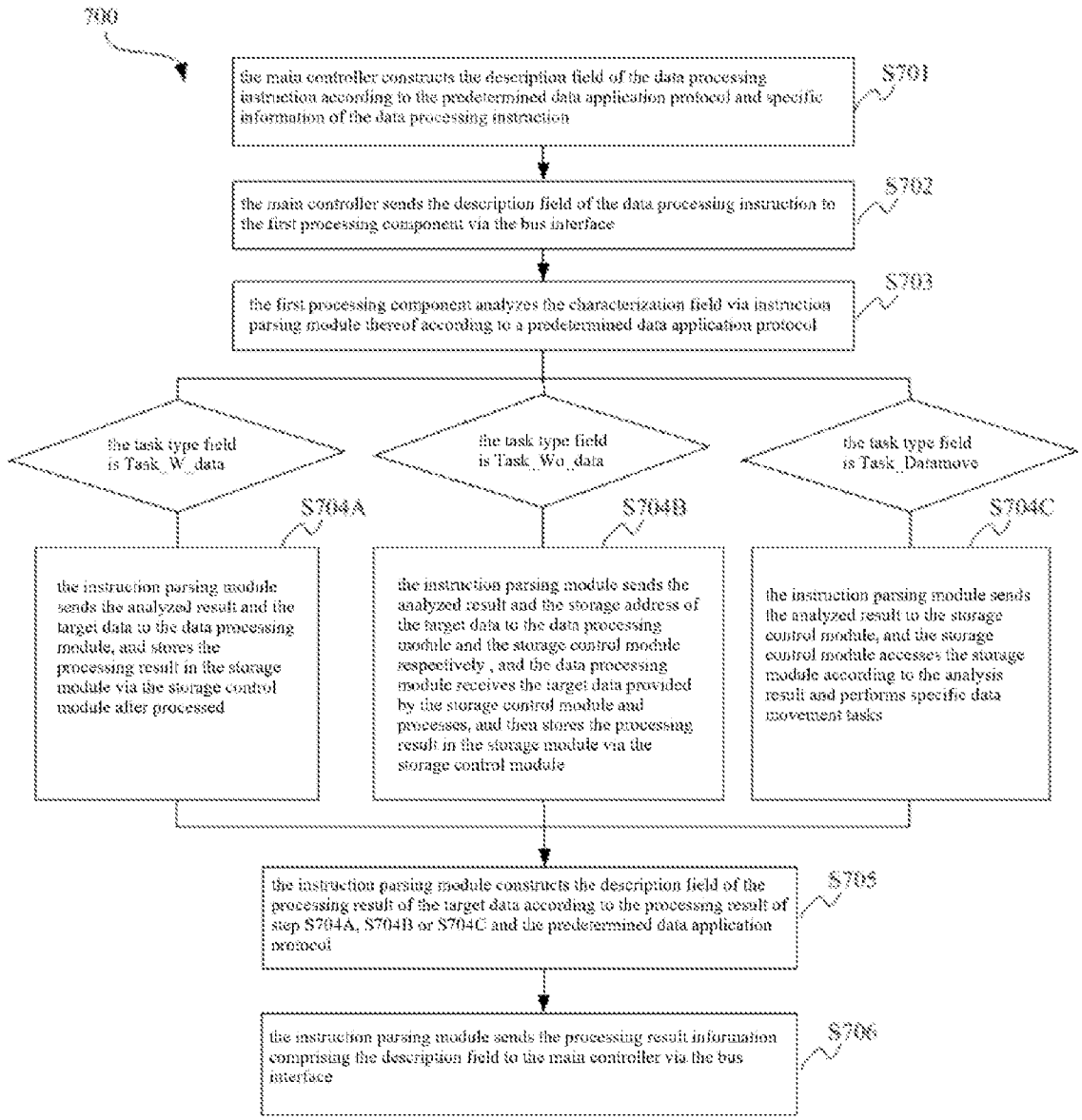
FIG. 7 shows a flowchart of another data access and processing control method 700 of the distributed processing system 300 shown in FIG. 3.

FIG. 7 shows a flowchart of another data access and processing control method 700 according to the distributed processing system 300 shown in FIG. 3. As shown in FIG. 7, in step S701, the main controller 304 constructs the description field of the data processing instruction according to the predetermined data application protocol and specific information of the data processing instruction, and the character information of the task type field is selected from: Task_W_data representing processing data instructions with data to be processed, Task_Wo_data representing instructions without data to be processed, and Task_Datamove for data movement instructions. In step S702, the main controller 304 sends the description field of the data processing instruction to the first processing component 301 via the bus interface. Subsequently, in step S703, the first processing component 301 analyzes the description field of the data processing instruction via instruction parsing module 311 thereof according to a predetermined data application protocol to determine the specific task type, instruction identification information, and predetermined specific data processing operation information of the data processing instruction.

When determining the character information of the task type field in the description field of the data processing instruction is Task_W_data, in step S704A, the instruction parsing module 311 sends the specific information of the analyzed data processing instruction and the data to be processed to the data processing module 312 directly. Subsequently, the data processing module 312 processes the data to be processed according to the specific information of the predetermined data processing operation, and sends the processing result to the storage control module 313, and stores the processing result in the storage module 314 via the storage control module 313.

When determining the character information of the task type field in the description field of the data processing instruction is Task_Wo_data, in step S704B, the instruction parsing module 311 sends the specific information of the analyzed data processing instruction to the data processing module 312, and sends the specific storage address of the analyzed target data to be processed in the storage module 314 to the storage control module 313 at the same time. Subsequently, the storage control module 313 accesses the storage module 314 according to the specific storage address and provides the target data to be processed to the data processing module 312. The data processing module 312 then processes the target data to be processed according to the specific information of the received analyzed data processing instruction and stores the processing result in the storage module 314 via the storage control module 313.

When determining the character information of the task type field in the description field of the data processing instruction is Task_Datamove, in step S704C, the current specific storage address, specific read and write operations, and/or target storage address of the target data in the storage module 314 are obtained by the parsing of the instruction parsing module 311 based on the description field. The instruction parsing module 311 sends the analyzed specific information to the storage control module 313. Subsequently, the storage control module 313 accesses the storage module 314 according to the received analyzed specific information and performs specific data movement tasks.

After step S704A, 5704B or 5704C, the instruction parsing module 311 performs step S705. Specifically, it constructs the description field of the processing result of the target data according to the processing result of step S704A, 5704B or 5704C and the predetermined data application protocol. In some embodiments, the field description information comprises at least instruction identification information of the data processing instruction, such as the instruction identification field described above. Subsequently, in step S706, the instruction parsing module 311 sends the processing result information comprising the description field of the target data processing result to the main controller 304 via the bus interface.

It should be noted that although in this embodiment, the first processing component 301 performs the step of storing the processing result in the storage module 314 in steps S704A, S704B or S704C, but in some embodiments, the first processing component 301 may not perform the step of storing the processing result mentioned above, but only send the processing result to the main controller 304. Correspondingly, in some embodiments, the first processing component 301 may not perform step S705, and step S705 is performed after receiving the returning processing result instruction with the task type field Task_Result_Return from the main controller 304.

Besides, it should be noted that all of the first processing component 301 and its sub-modules and the second processing component 302 and its sub-modules or other processing components and their sub-modules coupled to the bus 303 in the description of FIG. 5A, FIG. 5B, FIG. 5C, FIG. 6 or FIG. 7 mentioned above are only distinguished for the purpose of description. In other embodiments, the first processing component 301 and the second processing component 302 and other similar processing components have the same or similar functions, which will not be repeated herein.

It can be understood that the processing device in the embodiment of the present application may be applied to a memory, and such memory and the distributed processing system in the embodiment of the present application may be used in different computer systems.

It should be noted that although several modules or sub-modules of the processing devices or distributed processing systems are mentioned in the above detailed description, this division is only exemplary and not mandatory. In fact, according to the embodiments of the present application, the features and functions of two or more modules described above may be embodied in one module. In contrast, the features and functions of one module described above may be further divided into multiple modules to be embodied.

Those skilled in the art may understand and implement other changes to the disclosed embodiments by reading the specification, the disclosed content, the drawings and the appended claims. In the claims, the wording "comprising" and "including" do not exclude other elements and steps, and the wording "a", "an" and "one" do not exclude plurals. In the actual application of the present application, one component may perform the functions of multiple technical features recited to in the claims. Any reference numerals in the claims shall not be construed as limiting the protection scope.

What is claimed is:

1. A processing device, coupled to a storage module, for controlling access to the storage module and performing data processing, the processing device comprising:
    an instruction parsing module configured to receive a data processing instruction indicating a predetermined data processing operation on target data, wherein the data processing instruction comprises a task type field, a data processing operation field, and a data address field; the instruction parsing module is further configured to analyze the data processing instruction, and determine whether the data address field of the data processing instruction carries the target data or a storage address of the target data according to the task type field in the data processing instruction obtained by the instruction parsing module through parsing; and
    a data processing module coupled to the instruction parsing module and configured to perform the predetermined data processing operation on the target data according to the data processing operation field in the data processing instruction obtained by the instruction parsing module;
    wherein, when the data processing instruction carries the target data, the data processing module receives the target data carried in the data address field of the data processing instruction from the instruction parsing module to perform the predetermined data processing operation on the target data;
    when the data address field of the data processing instruction carries the storage address of the target data in the storage module, the processing device accesses the storage module according to the storage address and obtains the target data stored in the storage module.

2. The processing device of claim 1, wherein the processing device is further configured to store a processing result of the predetermined data processing operation performed by the data processing module in the storage module.

3. The processing device of claim 1, wherein the processing device is further configured to issue a processing result of the predetermined data processing operation performed by the data processing module by the instruction parsing module.

4. The processing device of claim 1, wherein the target data stored in the storage module is transferred from an external storage device to the storage module in advance.

5. The processing device of claim 4, wherein the external storage device comprises an external storage module and an external processing device coupled to the external storage module, and the external processing device is configured to control access to the external storage module and process data.

6. The processing device of claim 1, wherein the processing device further comprises a storage control module, and the storage control module is coupled to the instruction parsing module, the storage module, and the data processing module, and the storage control module is configured to access the target data stored in the storage module according to the storage address when the data address field of the data processing instruction does not carry the target data.

7. The processing device of claim 1, wherein the instruction parsing module is further configured to, after receiving the data processing instruction, send feedback information based on the state of the processing device to indicate whether the data processing instruction will be executed.

8. The processing device of claim 7, wherein the data processing instruction comprises instruction identification information for identifying the data processing instruction, and the feedback information comprises the instruction identification information.

9. A distributed processing system, comprising a main controller and one or more processing components coupled via a bus, wherein:
    the processing component comprises a storage module and a processing device coupled to the storage module, the processing device is configured to control access to the storage module and process data;
    the main controller is configured to provide the processing device with a data processing instruction for performing a predetermined data processing operation on target data, the data processing instruction comprises a task type field, a data processing operation field, and a data address field; the main controller is further configured to carry the target data or a storage address of the target data in the data address field of the data processing instruction;
    the processing device is configured to receive and analyze the data processing instruction, and determine whether the data processing instruction carries the target data according to the task type field in the data processing instruction obtained by parsing, and when the data address field of the data processing instruction carries the target data, the processing device performs the predetermined data processing operation on the target data according to the data processing operation field in the data processing instruction; when the data address field of the data processing instruction carries the storage address of the target data, the processing device accesses the storage module according to the storage address to obtain the target data stored in the storage module, and performs the predetermined data processing operation on the target data according to the data processing operation field in the data processing instruction.

10. The distributed processing system of claim 9, wherein the distributed processing system comprises a plurality of the processing components, wherein the target data in the storage module of at least one processing component is transferred from the storage module of at least one of the other processing components in advance.

11. The distributed processing system of claim 10, wherein the main controller is further configured to control at least one processing component to provide the target data in the storage module thereof to at least one of the other processing components.

12. The distributed processing system of claim 9, wherein the processing device comprises:
an instruction parsing module configured to analyze the data processing instruction; and
a data processing module coupled to the instruction parsing module and configured to perform the predetermined data processing operation on the target data.

13. The distributed processing system of claim 12, wherein the processing device is further configured to store a processing result of the predetermined data processing operation performed by the data processing module in the storage module.

14. The distributed processing system of claim 12, wherein the processing device is further configured to send the processing result of the predetermined data processing operation performed by the data processing module to the main controller by the instruction parsing module.

15. The distributed processing system of claim 12, wherein the processing device further comprises a storage control module coupled to the instruction parsing module, the storage module, and the data processing module, and the storage control module is configured to access the target data stored in the storage module according to the storage address when the data address field of the data processing instruction does not carry the target data.

16. The distributed processing system of claim 9, wherein the instruction parsing module is further configured to, after receiving the data processing instruction, send feedback information based on the state of the processing device to indicate whether the data processing instruction will be executed.

17. The distributed processing system of claim 16, wherein the data processing instruction comprises instruction identification information for identifying the data processing instruction, and the feedback information comprises the instruction identification information.

18. The distributed processing system of claim 9, wherein the storage modules of the one or more processing components can be addressed and accessed by the main controller.

19. The distributed processor system of claim 18, wherein the storage modules of the one or more processing components are unified addressed.

20. A method for controlling a processing device, the processing device comprising an instruction parsing module and a data processing module coupled to each other, and the processing device coupled to a storage module and configured to control access to the storage module and process data, wherein the control method comprises:
receiving a data processing instruction indicating a predetermined data processing operation on target data by the instruction parsing module, wherein the data processing instruction includes a task type field, a data processing operation field, and a data address field;
analyzing the data processing instruction by the instruction parsing module to determine whether the data address field of the data processing instruction carries the target data or a storage address of the target data according to the task type field in the data processing instruction;
wherein, when the data address field of the data processing instruction carries the target data, the data processing module receives the target data carried by the data processing instruction from the instruction parsing module, and performs the predetermined data processing operation indicated by the data processing operation field on the target data; when the data address field of the data processing instruction carries a storage address of the target data, the processing device accesses the storage module according to the storage address to obtain the target data stored in the storage module, and performs the predetermined data processing operation indicated by the data processing operation field on the target data.

21. A method for controlling data access and processing in a distributed processing system comprising a main controller and one or more processing components coupled via a bus, wherein the processing component comprises a storage module and a processing device coupled to the storage module, the processing device is configured to control access to the storage module and process data, and the method comprises:
providing a data processing instruction for performing a predetermined data processing operation on target data to the processing device by the main controller, wherein the data processing instruction comprises a task type field, a data processing operation field, and a data address field, the data address field carries the target data or a storage address of the target data;
receiving and analyzing the data processing instruction by the processing device, and determining whether the data processing instruction carries the target data according to the task type field in the data processing instruction obtained through parsing, and when the data address field of the data processing instruction carries the target data, the processing device performs the predetermined data processing operation on the target data according to the data processing operation field in the data processing instruction; when the data address field of the data processing instruction carries the storage address of the target data, the processing device accesses the storage module according to the storage address to obtain the target data stored in the storage module, and performs the predetermined data processing operation on the target data according to the data processing operation field in the data processing instruction.

* * * * *